United States Patent [19]

Aumann et al.

[11] 4,095,398
[45] Jun. 20, 1978

[54] GRASS BAGGER

[76] Inventors: Richard F. Aumann, 252 Dolphin Point; Robert J. Aumann, 223 Dolphin Point, both of Clearwater, Fla. 33515

[21] Appl. No.: 690,163

[22] Filed: May 26, 1976

Related U.S. Application Data

[63] Continuation of Ser. No. 508,277, Sep. 23, 1974, abandoned.

[51] Int. Cl.² .............................................. A01D 35/22
[52] U.S. Cl. ........................................ 56/202; 56/12.8; 56/13.4; 56/16.6
[58] Field of Search .................... 56/202, 12.8-13.4, 56/328, 30, 16.6; 15/83, 340, 341, 342, 345-352

[56] References Cited

U.S. PATENT DOCUMENTS

| | | | |
|---|---|---|---|
| 2,878,508 | 3/1959 | Sedgwick | 56/13.1 X |
| 3,087,187 | 4/1963 | Hank et al. | 15/340 |
| 3,522,695 | 8/1971 | Musgrave | 56/16.6 |
| 3,624,989 | 12/1971 | Gatheridge | 56/202 |
| 3,634,904 | 1/1972 | Larsen | 15/340 |
| 3,716,977 | 2/1973 | Jackson | 56/202 |
| 3,961,467 | 6/1976 | Carpenter | 56/202 |

*Primary Examiner*—Russell R. Kinsey
*Attorney, Agent, or Firm*—Stein & Frijouf

[57] ABSTRACT

This invention relates to a collecting assembly for grass cuttings, clippings, various debris, etc. and it is designed primarily to be used in combination with a cutting machine. The cutting machine may be a riding mower or a push or walk behind type. A storage means including a removable container element for receiving the debris is arranged in fluid communication with a negative pressure source which may be a vacuum-type pump or impeller element disposed in fluid communication with the storage means to create a negative pressure therein. Conduit means interconnects the cutting deck or cutting area of the cutting machine with the storage means wherein the cutting area, conduit means, storage means and negative pressure source means are all arranged in fluid communication so as to substantially define a negative fluid flow pressure throughout the system. Fluid flow is accordingly directed from the cutting area along with the debris entrained in said fluid flow into the storage area. Filter means is positioned in path interruptive relation between the interior of the storage means and the negative pressure source so as to allow filtered or debris free air from leaving the storage means and exiting to atmosphere through direction of the negative pressure source.

10 Claims, 7 Drawing Figures

GRASS BAGGER

This is a continuation of application Ser. No. 508,277 filed Sept. 23, 1974 and now abandoned.

BACKGROUND OF THE INVENTION

1. Field of the Invention

A collecting assembly for cuttings, clippings and debris used in combination with a lawn mower type cutting machine wherein fluid flow is established throughout the collecting assembly by the provision of a negative pressure source disposed in fluid communication with the remainder of the collecting assembly.

2. Description of the Prior Art

The collecting of debris, clippings and cuttings associated with the cutting of grass has been a problem long recognized in the lawn and grass care industry. Accordingly, a plurality of collecting devices exist in the prior art and are presently commercially available. The vast majority of these are directed to the "blowing" of the debris and clippings initially collected in the cutting area of a cutting machine out through the cutting deck or housing into some type of collecting container or the like.

A problem commonly associated with collecting the cuttings and debris is associated with the efficient and effective removal of the collected debris, once collected in a storage area or the like, to its point of ultimate disposal. In numerous of the prior art devices, this includes stopping machine, frequently breaking down the collection unit itself, transferring the cut debris or clipping into another container either manually or through the help of some type of vacuum pickup machinery and then hauling the transferred collection to the ultimate point of disposal. A peculiar problem associated with the collection of cut grass, clippings and like debris is its ability to be "packed" down into a bale type configuration. This occurs due to the normal vibration associated with the collection container or the like being mounted on the cutting machine itself. The normal settling or automatic compacting of the grass clippings, etc. will cause the collected debris and clipping to take up a much smaller area. In conventional collecting apparatus, once the capacity of the collecting device has been reached, it is transferred into a stationary container or to its point of ultimate disposal. This transfer causes the clippings and debris to "fluff up" and become uncompacted thereby causing it to take up a much greater volume. Obviously, a great advantage would be realized if the collected debris could be maintained in this compacted state throughout its transfer to its point of ultimate disposal.

Another problem commonly associated with the common or conventional collecting assembly is the creation of back pressure in the connected storage or collecting container. The positive flow of fluid created by the positive fluid pressure of the rotating blade in the cutting area causes a volume of air and the debris entrained therein to be forceably directed into the storage container, etc. As readily obvious, this has a tendency to create extreme back pressure within the collecting container itself and somewhat inhibits the actual collection of the debris.

Accordingly, it can be seen that there is a need in the industry for an effective collecting assembly capable of efficiently transferring debris, clippings, etc. from the cutting area of a cutting machine into a storage area. In addition, the efficient removal of the clippings in a compacted state so as to eliminate the problem of debris transfer should be capable of being readily accomplished by a preferred collecting assembly. Further, such a collecting assembly should ideally comprise simple structural design capable of being readily mountable on either a riding type cutting machine or a walk behind or push type cutting machine as is well known and presently commercially available.

SUMMARY OF THE INVENTION

The collecting assembly of the present invention comprises a storage means including a container means pivotally or movably mounted on the cutting machine and arranged in fluid communication with both a negative fluid pressure source and the cutting area of the cutting machine in which the clippings, debris or cuttings are originally collected. By virtue of the rotary movement of the blade, air currents are set up which causes entrainment of the produced clippings or debris in the turbulent body of air created by the movement of the blade. A first conduit means extends from the cutting area to the interior of the storage means and container means contained therein. Similarly, a negative fluid pressure source means in the form of a vacuum pump or impeller, etc. also is arranged in fluid communication with the interior of the storage means and the first conduit means. Therefore, a negative pressure fluid flow is established from the cutting area by virtue of the first conduit means into the storage means and the container means contained therein. This negative fluid pressure further defines a flow of fluid from the storage means to the source of negative air pressure and eventually into atmosphere.

More specifically, the storage means and container means contained therein may include a disposable container element in the form of a plastic disposable bag contained within the storage means itself. As the debris flows into the container means it is collected in the disposable container element. The natural vibration due to the movement and operation of the cutting machine causes a settling or "shaking" of the collected debris into a compacted state generally conforming to the general configuration of the storage means and/or container elements therein. This has the advantageous effect of reducing the overall volume required by a given amount of debris thereby enabling larger quantities of debris to be collected. When the capacity of the container element has been reached, the bag is simply removed from the storage means, as will be explained in greater detail hereinafter, tied off at the top and set aside for eventual pickup at a later date. An important feature of the present invention is the maintenance of the collected debris in the compacted state such that transfer by truck or like vehicle to its ultimate point of disposal can be accomplished without fluffing up or unpacking the debris.

Fluid communication between the cutting area and the storage means is established by an elongated first conduit means mounted on the cutting deck and arranged in fluid communication with the cutting area on the interior of the deck adjacent the area of the cutting blade. Withdrawal of the flow of fluid and entrained debris from the cutting area through the deck can take place at any applicable point such as at the side of the deck or at the rear of the deck as is desired. The first conduit means itself may include a plurality of relatively movable portions arranged in substantially telescopic relation to one another so as to compensate for any displacement or movement between the cutting deck, cutting machine and storage means itself. In addition, the portion of the first conduit directly attached to the storage means is movable or movably mounted thereon to compensate for relative movements between the conduit means and the storage means. A second, preferably flexible conduit means is arranged between the source of negative fluid pressure and the interior of the storage means itself.

In addition to establishing a negative air pressure throughout the entire collector assembly, the specific, relative locations of the negative source of air pressure, storage means and cutting area allows the removal of back pressure from the storage means itself which is normally caused by the flow of fluid or air directed from the cutting area into the storage means.

A filter means is further provided in path interruptive relation relative to the flow of fluid as it passes from the storage means or container element into the second conduit means leading to the negative fluid pressure source means. This serves to maintain all debris, clippings, etc. in the container element and out of the flow of fluid passing through the second conduit means to the negative source of fluid pressure and eventually to atmosphere.

A deflector means is also mounted on the interior of the storage means in interruptive relation to the incoming flow of fluid and entrained debris passing from the first conduit means into the storage means or container element. The deflecting means is so disposed and configured to have the debris impinge thereon and cause its deflection directly into the container element. This serves to separate out the larger parts of debris, clippings, etc. from the flow of fluid passing from the first conduit means. It should be emphasized that the collector assembly of the present invention as generally described above can readily be mounted on any conventional type of riding mower, walk behind mower, push mower or the like. In addition, the specific disposition of the various components comprising the collector assembly relative to the cutting machine itself is not a limiting or important portion of the present invention as long as proper fluid flow is established in fluid communication between the negative source of air pressure means, the storage means and the cutting area.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention reference should be had to the following detailed description taken in connection with the accompanying drawings in which.

Similar reference characters refer to similar parts throughout the several views of the drawings.

DETAILED DESCRIPTION

Figure 1:
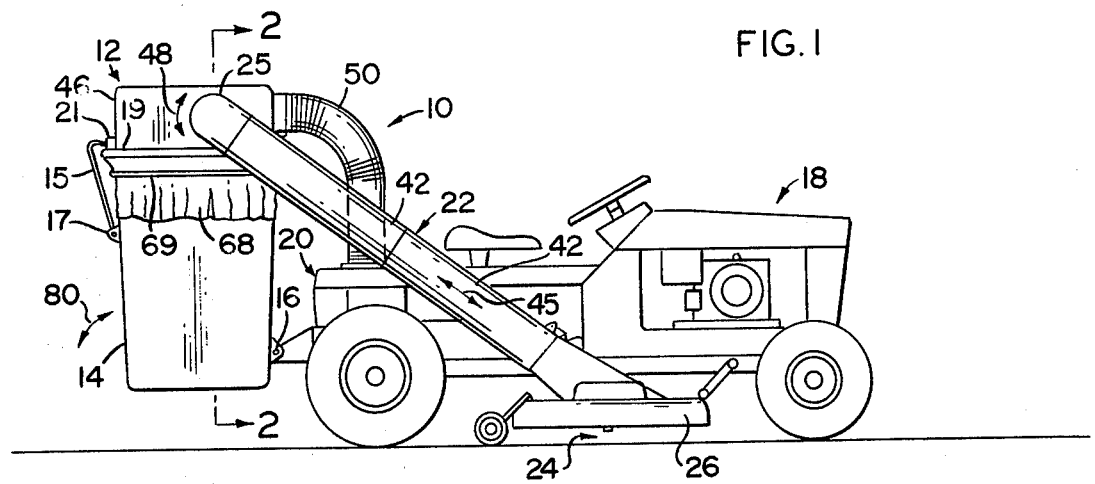
FIG. 1 is a side plan view of the the collector assembly mounted on a riding-type mower.

As shown in FIG. 1, the collector assembly generally indicated as 10 is mounted on a riding type cutting machine such as a lawm mower or the like. The cutting assembly includes a storage means 12 including container means 14 movably mounted as at 16 onto the frame or other portion of the cutting machine itself generally indicated as 18.

Figures 4, 5, 6, 7:
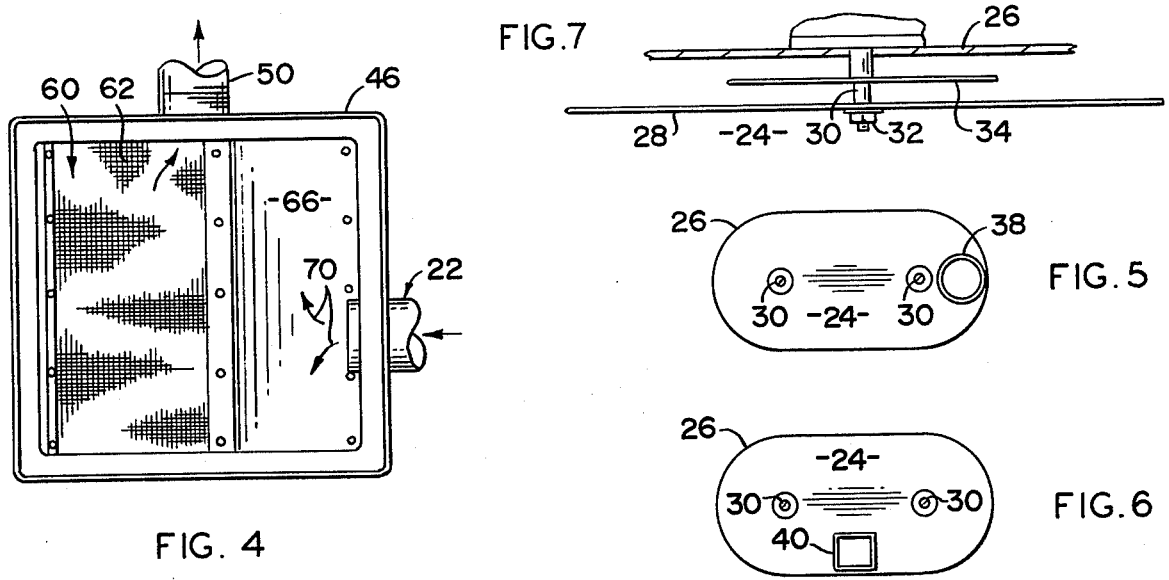
FIG. 4 is a sectional view taken along line 4—4 of FIG. 2 showing details of the interior of the filter means and deflector means mounted on the interior of the storage means.
FIGS. 5 and 6 are detailed views showing the interior of the cutting decks of the cutting machine and the fluid outlet located at the side and rear thereof for connection with the first conduit means so as to direct fluid flow and entrained debris from the cutting edge into the storage means.
FIG. 7 is a fragmentary sectional view taken through the cutting deck of the mower.

A negative fluid pressure source means generally indicated as 20 is also connected to the cutting machine or mounted thereon in fluid communication with the interior of storage means 12 and container means 14, by virtue of first conduit means 22 with a cutting area generally represented as 24 (FIG. 7). The cutting area is defined generally by the interior of the cutting deck 26 which mount the cutting blade 28 (FIG. 7) on a driven shaft 30 and connected thereto by conventional connector 32. A source of fluid flow is generally indicated as 34 and may comprise an auxiliary blade or impeller type structure mounted on shaft 30 in spaced relation to the blade 28. Also, the cutting blade 28 may serve as the source of fluid flow within the cutting area virtue of its rotary motion and the creation of air turbulence within the cutting area 24. This creation of turbulence causes entrainment of the debris, clippings, cuttings, etc. into the fluid flow of this fluid flow and entrained debris.

Figures 2, 3:
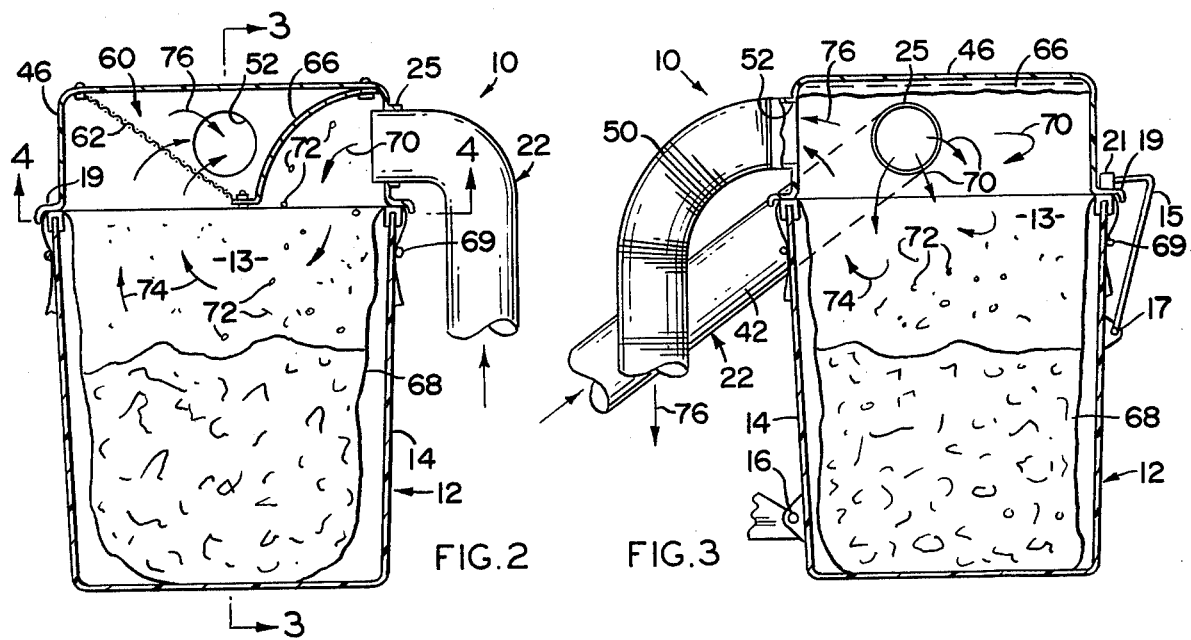
FIG. 2 is a sectional view taken along line 2—2 of FIG. 1 showing the detail of the interior of the storage means.
FIG. 3 is a sectional view taken along line 3—3 of FIG. 2 showing additional details of the interior of the storage means.

With brief reference to FIGS. 5 and 6, apertures 38 and 40 respectively, represent apertures of various dispositions and configurations which communicate with the interior of the deck 26 and cutting area 24 and serve to direct fluid therefrom into conduit 22. Specifically, these apertures represent the point of connection of the conduit 22 with the cutting deck. With specific reference to the conduit 22, the conduit may include a plurality of movable disposed conduit portions 40 and 42 arranged in telescopic and/or otherwise moving relation to one another such that displacement between cutting deck 26 and/or machine 18 and the storage means 12 is compensated for through the movable mounting as indicated by directional arrows 45 of the first conduit relative thereto. With reference to FIG. 2, conduit 22 is movably mounted thereon at junction 25 so as to allow movable relation between the head portion 46 and storage means 12 as indicated by directional arrow 48 (FIG. 1).

It should be further emphasized that fluid flow and the entrained cuttings from the cutting area 24 can exit into conduit 42 through essentially any given point of the deck including the sides, rear and front wall portions. Exiting of fluid flow should not be considerd to be limited to the base of the deck, through apertures 38 and 40 as indicated in FIGS. 5 and 6.

The storage means 12 further comprises the head means 46 previously mentioned wherein the head means is provided for mounting first conduit 22 and a secondary or auxiliary conduit means 50 arranged in fluid communication to the negative fluid pressure source means 20. The details of the head portion 46 is clearly shown in FIGS. 2 and 3 and comprises the junction or connecting portion 25 to which first conduit means 22 is movably connected. Similarly, a second aperture or junction 52 is provided in the head portion 46 in fluid communication with the interior of the storage means 12 for connecting the second conduit 50 thereto. Connector means in the form of a bracket or the like is pivotally connected to the container means 14 and 17 and disposed to pivotally engage the lower peripheral portion 19 by the locking member 21 of bracket 15.

Turning to FIG. 4, the filter means generally indicated as 60 is mounted in the head portion 46 of the storage means and includes a screen type filter element 62 disposed in fluid interruptive relation relative to the patch of fluid flow from the interior of the storage means 13 through aperture 52 into or towards the negative fluid pressure source means 20. This filter screen 62 is specifically disposed and configured to remove all debris, clippings, cuttings etc. from the fluid flow as it passes through aperture 52. Thereby, relatively clean air passes back into the negative fluid pressure source means. Deflector means 66 is also mounted in head portion 46 and is specifically disposed and configured in relatively interruptive relation to the incoming flow of fluid from first conduit means 22. Specifically, the deflector means 66 comprises, in the embodiment shown, a substantially arcuate plate disposed to have the entrained debris, clippings, cuttings etc. impinge on the deflector means and thereby drop into the container means 14 as shown.

The storage means and container means further comprises a disposable container element 68 mounted therein and generally configured to correspond to the interior configuration of the container means 14. This container element 68 may be in the form of a conventional disposable bag appropriately designed and configured to cooperate with the container means 14 and storage means 12. Connectors 69 are mounted on the container means 14 in appropriate location so as to secure the container element 68 on the interior thereof.

In operation, incoming fluid flow from first conduit 22 enters the head 46 and storage means 12 as indicated by directional arrow 70. The entrained particles of debris, clippings, etc. 72 pass from the first conduit means 22 and may impinge the deflector means 66 whereupon they are directly dropped into the disposable container element 68, as shown. In order to eliminate back pressure, the flow of fluid 74 passes from the interior of the storage means or container means 12 and 14 respectively through aperture 52 as indicated by directional arrows 74 and 76. After passing through second conduit means 50 and into the negative flow of pressure source means 20 the flow of fluid may be passed to atmosphere. The location of filter element 62 serves to insure separation of any debris, clippings, cuttings, etc. from the flow of fluid 74 and 76 through the aperture 52 which exits to atmosphere.

Upon the debris filling the capacity of container element 68, the container means 14 is pivoted about connecting point 16 as indicated by directional arrows 80 and the head section 46 is removed therefrom so that the bag or disposable container element 68 may be removed therefrom, tied, and a new one replaced in its position.

It will thus be seen that the object set forth above, among those made apparent from the preceding description, are efficiently attained and, since certain changes may be made in carrying out the above method and article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,
What is claimed is:

1. A cutting machine with a cutting means and a collecting assembly for the cut debris, said assembly comprising: a positive source of fluid flow contiguous to the cutting means and in fluid communication therewith, debris storage means, a first conduit means interconnected between the cutting means and said debris storage means to establish fluid communication therebetween, said positive source of fluid flow comprising impeller means rotatably mounted in the cutting means of the cutting machine, whereby debris is entrained in the established fluid flow and directed through said first conduit, a negative pressure source means independent of said positive source of fluid flow and disposed in fluid communication with said debris storage means and said cutting means said first conduit means, said negative pressure source means comprising a second conduit means interconnecting in fluid communication said storage means and said negative pressure source means, whereby enhanced fluid flow is established from said cutting area through said storage means, said debris storage means comprising container means connected to said cutting machine and being disposed in fluid communication with both said positive source of fluid flow and said negative fluid pressure, and said container means adapted to receive a disposable container element in which debris is removable from said container means as a desired quantity is collected.

2. The cutting machine of claim 1 wherein the cutting means comprises a driven shaft for rotating a cutting blade; and said positive source of fluid flow comprising an auxiliary impeller mounted on said shaft for rotation therewith for creating an air flow within the cutting area through said first conduit.

3. The cutting machine of claim 1 wherein said container means is movable connected to the cutting machine and positionable for access to the interior of said storage means whereby contents of said storage means may be removed therefrom.

4. The cutting machine of claim 3 wherein said first conduit means is adjutably interconnected and positioned between said storage means and said, whereby relative displacement between said storage means and the cutting machine is compensated for.

5. The cutting machine of claim 1 wherein said storage means comprises head means mounted thereon, said first conduit means and said negative pressure source means are each connected to said head in fluid communicating relation to one another and the interior of said storage means.

6. The cutting machine of claim 5 wherein said head means is movably attached to at least said first conduit means for relative movement therebetween during operation or movement of the cutting machine.

7. The cutting machine of claim 1 further comprising filter means connected to said storage means and disposed in the path of fluid flow between said negative pressure source means and said storage means, whereby debris is filtered from fluid flow to said negative pressure source means.

8. The cutting machine of claim 7 further comprising screen means dimensioned in predetermined relation relative to the collected debris directed to said storage means to prevent passage thereof through said second conduit.

9. The cutting machine of claim 7 further comprising deflector means in interruptive relation relative to the flow of fluid and entrained debris, said deflecting means further disposed relative to the remainder of the storage means as to direct debris impinging thereon into said storage means.

10. A cutting machine a cutting means and a collecting assembly for the cut debris, said assembly comprising: a positive source of fluid flow contiguous to the cutting means and in fluid communication therewith, debris storage means, a first conduit means interconnected between the cutting means said debris storage means to establish fluid communication therebetween, said positive source of fluid flow comprising impeller means rotatably mounted in the cutting area of the cutting machine, whereby debris is entrained in the established fluid flow and directed through said first conduit, a negative pressure source means independent of said positive source of fluid flow and disposed in fluid communication with said debris storage means and said cutting means via said first conduit means, said negative pressure source means comprising a second conduit means interconnecting in fluid communication said storage means and said negative pressure source means, whereby enhanced fluid flow is established from said cutting means said storage means, said debris storage means comprising container means connected to said cutting machine and being disposed in fluid communication with both said positive source of fluid flow and said negative fluid pressure, said container means adapted to receive a disposable container element in which debris is collected, whereby collected debris is removable from said container means as a desired quantity is collected, said container means being movably connected to the cutting machine and positionable for access to the interior of said storage means for removing the contents of said storage means, sad first conduit means being adjustably interconnected and positioned between said storage means and said to compensate for relative displacement between said storage means and the cutting machine, said storage means comprising head means mounted thereon, aid first conduit means and said negative pressure source means each being connected to said head in fluid communicating relation to one another and the interior of said storage means, said head means being movably attached to at least said first conduit means for relative movement therebetween during operation or movement of the cutting machine.

* * * * *

UNITED STATES PATENT OFFICE
CERTIFICATE OF CORRECTION

Patent No. 4,095,398            Dated June 20, 1978

Inventor(s) Richard F. Aumann et al.

It is certified that error appears in the above-identified patent and that said Letters Patent are hereby corrected as shown below:

```
col. 6, line 48:  "movable" should be --movably--;
        line 53:  "adjutably" should be --adjustably--;
        line 53:  after "said" insert --cutting means--;
Col. 7, line 16:  after "machine" insert --with--; delete
                  "means" and insert --area--therefor;
        line 19:  delete "means" and insert --area--;
        line 21:  delete "means" and insert --area--;
Col. 8, line 1:   delete "means" and insert --area;
        line 6:   delete "means" and insert --area--;
        line 17:  "sad" should be --said--;
        line 19:  after "said" insert --cutting means--;
        line 22:  "aid" should be --said--
```

Signed and Sealed this

Sixteenth Day of January 1979

[SEAL]

Attest:

RUTH C. MASON
*Attesting Officer*

DONALD W. BANNER
*Commissioner of Patents and Trademarks*